US009789757B2

(12) United States Patent
Hedman et al.

(10) Patent No.: US 9,789,757 B2
(45) Date of Patent: Oct. 17, 2017

(54) POWERTRAIN FOR A HYBRID VEHICLE AND A METHOD FOR CONTROL OF THE POWERTRAIN

(75) Inventors: Anders Hedman, Marstrand (SE); Lisa Ehrlich, Mölnlycke (SE)

(73) Assignee: Volvo Lastvagnar AB, Göteborg (SE)

(*) Notice: Subject to any disclaimer, the term of this patent is extended or adjusted under 35 U.S.C. 154(b) by 253 days.

(21) Appl. No.: 14/425,642

(22) PCT Filed: Sep. 5, 2012

(86) PCT No.: PCT/EP2012/003724
§ 371 (c)(1),
(2), (4) Date: Mar. 5, 2015

(87) PCT Pub. No.: WO2014/037018
PCT Pub. Date: Mar. 13, 2014

(65) Prior Publication Data
US 2015/0224865 A1  Aug. 13, 2015

(51) Int. Cl.
*B60K 6/387* (2007.10)
*B60K 6/48* (2007.10)
(Continued)

(52) U.S. Cl.
CPC ............... *B60K 6/387* (2013.01); *B60K 6/36* (2013.01); *B60K 6/48* (2013.01); *B60K 6/547* (2013.01);
(Continued)

(58) Field of Classification Search
CPC .. B60K 6/387; B60K 6/36; B60K 2006/4816; B60K 6/48; B60K 6/547; B60K 2006/4825; B60W 30/19; B60W 10/113; Y10T 74/19014; Y10S 903/946; Y10S 903/914; Y02T 10/6221; Y02T 10/6256;
(Continued)

(56) References Cited

U.S. PATENT DOCUMENTS

2002/0033059 A1  3/2002  Pels et al.
2007/0022835 A1  2/2007  Kilian et al.
(Continued)

FOREIGN PATENT DOCUMENTS

CN  1682046 A   10/2005
CN  102015399 A   4/2011
(Continued)

OTHER PUBLICATIONS

Chinese Official Action (Aug. 2, 2016) for corresponding Chinese App. 201280075667.7.
(Continued)

*Primary Examiner* — Victor MacArthur
(74) *Attorney, Agent, or Firm* — WRB-IP LLP (57) ABSTRACT

A powertrain for a hybrid vehicle includes a first propulsion unit for powering the vehicle, a second propulsion unit for powering the vehicle, a Dual Clutch Transmission (DCT), and the second propulsion unit the ECU is programmed to control the gear shift such that when a gear shift of the first propulsion unit is made in order to change the overall gear ratio from the first input shaft to the output shaft by changing the double clutch engagement from the second clutch, engaging the second power path, to the first clutch, engaging the first power path, the power connection between the second propulsion unit and the second power path is maintained.

10 Claims, 6 Drawing Sheets

(51) Int. Cl.
  *B60K 6/547*    (2007.10)
  *B60W 10/113*   (2012.01)
  *B60W 30/19*    (2012.01)
  *F16H 3/00*     (2006.01)
  *B60K 6/36*     (2007.10)
  *F16H 3/091*    (2006.01)

(52) U.S. Cl.
  CPC ........ *B60W 10/113* (2013.01); *B60W 30/19* (2013.01); *F16H 3/006* (2013.01); *B60K 2006/4816* (2013.01); *B60K 2006/4825* (2013.01); *F16H 3/0915* (2013.01); *F16H 2200/0052* (2013.01); *Y02T 10/6221* (2013.01); *Y02T 10/6256* (2013.01); *Y10S 903/914* (2013.01); *Y10S 903/946* (2013.01); *Y10T 74/19014* (2015.01)

(58) Field of Classification Search
  CPC . F16H 3/0915; F16H 2200/0052; F16H 3/006
  See application file for complete search history.

(56) References Cited

U.S. PATENT DOCUMENTS

| | | |
|---|---|---|
| 2008/0000312 A1 | 1/2008 | Lang et al. |
| 2008/0234098 A1 | 9/2008 | Leufgen |
| 2010/0065353 A1 | 3/2010 | Hobel |
| 2011/0030488 A1 | 2/2011 | Gumpoltsberger et al. |
| 2011/0174558 A1 | 7/2011 | Tanba et al. |

FOREIGN PATENT DOCUMENTS

| | | |
|---|---|---|
| DE | 10143289 A1 | 3/2003 |
| WO | 2011069530 A1 | 12/2009 |

OTHER PUBLICATIONS

International Search Report (Mar. 4, 2013) for corresponding International App. PCT/EP2012/003724.

Tenberge P: 11 Double-Clutch Transmission—Power-Shiftable Winding Transmission . VDI Berichte, Duesseldorf. DE. vol. 1665. Mar. 13, 2002 (Mar. 13, 2003). pp. 1033-1050. XP009094673: ISSN: 0083-5560 p. 1047-p. 1049; figure 11.

POWERTRAIN FOR A HYBRID VEHICLE AND A METHOD FOR CONTROL OF THE POWERTRAIN

BACKGROUND AND SUMMARY

The present invention relates to a powertrain and a control method for the powertrain for a hybrid vehicle comprising two separate power sources, e.g. an internal combustion engine and an electric motor.

In hybrid vehicles with automatic or semi-automatic transmissions (automatic or automatic in manual mode) is it desired to provide an efficient powertrain and powertrain control in order to be able to use the propulsion units efficiently. For hybrid vehicles, it is common practice to connect both propulsion units, e.g. an internal combustion engine and an electric motor, to the same gear box or transmission. Different powertrain arrangements and methods for the control of hybrid vehicles are for example disclosed in US 2007/022 835, US 2011/030 488, US 2010/065 353, US 2008/234 098 and DE 101 43 289. By controlling the powertrain automatically, different control strategies may be used efficiently depending on the desired goal to achieve, e.g. fuel efficient or smooth driving of the vehicle. Even though the above described arrangements provide working examples of powertrains for hybrid vehicles, there is still a desire to provide improved powertrain arrangements for hybrid vehicles.

The present invention, according to an aspect thereof, is directed to a powertrain for a hybrid vehicle and a control method for such a powertrain. The configuration of the powertrain enables a control method for a hybrid vehicle which is able to avoid or reduce power interruptions in the powertrain when changing gears.

The powertrain according to an aspect of the invention comprises a first propulsion unit and a second propulsion unit for propulsion of the vehicle. These propulsion units are connected to a transmission having a double clutch arrangement, a so called Dual Clutch Transmission (DCT). The DCT comprises a first input shaft connected to the double clutch arrangement and this first input shaft is connected to the first propulsion unit, e.g. an internal combustion engine (ICE). The double clutch is arranged such that when the first clutch is engaged, the first input shaft of the DCT is mechanically connected to an output shaft via a first power path and when the second clutch is engaged, the first input shaft of the DCT is mechanically connected to the output shaft via a second power path. Each of these two power paths comprises a main gear box, the same main gear box may be used for both power paths or two separate main gear boxes may be used for the different power paths. The main gear box, or main gear boxes, used comprises at least two gears having different gear ratios. Hence, a torque provided by the first propulsion unit is transferred from the first input shaft of the DCT to the output shaft of the DCT via either of said first and second power paths. The first and second power path are designed such that they define an overall gear ratio from the first input shaft to the output shaft which may differ depending on which path that is used and the selected gears of the selected power transmitting power path. The overall gear ratio is thus defined by at least the ratio of the selected clutch and the ratio of the selected gear in the main gear box associated with the selected clutch. There may of course be further arrangements which influence the gear ratio, either additional fixed gear ratio transmissions in the power path or further shiftable gears in addition to the gears of the main gear box. The gear ratios of the first and second power path are generally arranged such that a one-step gear shift, upshift or downshift, of the overall gear ratio from the first input shaft to the output shaft involves a shift of the power path for at least some of the gears. This means a one-step gear shift involves a change of the engaged clutch of the double clutch arrangement. In general, the gear ratios for this kind of gear boxes having a double clutch are adapted such that consecutive gears are defined in different power paths such that a one-step gear shift always involves a change of the engaged clutch in the double clutch arrangement.

The second propulsion unit, e.g. an electric motor, is connected to the second power path via a second input shaft to the power train. This means that the second input shaft is connected to the second power path downstream of the double clutch arrangement, i.e. the double clutch arrangement is bypassed. Hence, the power from the second propulsion unit will thus be transferred to the output shaft via the second power path when connected to the power train via the second input shaft. The second input shaft is connected to the second power path upstream the main gear box associated with the second power path such that a shift of the main gear for the second power path always also causes a shift of the main gear ratio from the second input shaft, connected to the second propulsion unit, to the output shaft. The second propulsion unit may be connected to the second input shaft via a clutch and/or a fixed gear ratio change.

The power train and DCT are connected to an Electronic Control Unit (ECU) which is configured to control the engagement and disengagement of the first and second clutches of the double clutch arrangement. The ECU is also configured to control the gear positions of the gears of the main gear box, or main gear boxes, associated with each one of the first and second power paths. The ECU may also be programmed to control the propulsion units and/or further clutches or gears comprised in the power train. By ECU is meant in this context either a single processor or a multitude of processors and memories which together form the ECU.

The above described configuration enables certain positive benefits when changing a gear such that the power interruption during gear changes is avoided or decreased.

The ECU may thus be programmed to control the power train during a gear shift and control gears, clutches and propulsion units. According to a first aspect of the invention, the ECU may control the powertrain such that the mechanical connection between the second propulsion unit and the second power path is maintained when there is a gear shift desired for changing the overall gear shift ratio from the first input shaft to the output shaft which involves a change of the engagement of the second clutch of the double clutch arrangement to be disengaged and the first clutch of the double clutch arrangement to be engaged. Hence, the mechanical connection in the second power path from the second input shaft to the output shaft is maintained when there is a change of engagement from the second clutch of the double clutch arrangement to the first clutch of the double clutch arrangement. To maintain the connection means that the connected second propulsion unit may for example be used either for braking, in case there is a desire for a braking operation during the gear shift, or to provide a propulsion force in case it is desired to provide continued propulsion torque during gear shift. If the second propulsion unit is an electric motor/generator, the braking force may be used to generate electricity.

According to a second aspect of the invention the ECU may be programmed to control the gear shifts to reduce the power interruptions when there is gear shift of the overall gear ratio from the first input shaft to the output shaft including a change of the double clutch engagement from the first clutch, engaging the first power path, to the second clutch, engaging the second power path. In this case the power connection between the second propulsion unit and the second power path may be maintained provided that the desired gear of the main gear box associated with the second power path is already selected in order to shift to the desired overall gear ratio from the first input shaft to the output shaft. This may for example be the case when there has been a one-step upshift to an overall gear ratio which is transferred to driving wheels via the first power path and there is a subsequent desire to perform a one step down shift, back to the previously used overall gear. This example is valid provided that no gear shift has been made in the main gear box associated with the second power path in between the upshift and downshift and that the two consecutive gears are designed to be selected by changing the double clutch engagement between the first and second clutch of the double clutch arrangement.

According to a third aspect of the invention the ECU may be programmed to control the gear shifts in an efficient way when there is gear shift of the overall gear ratio from the first input shaft to the output shaft including a change of the double clutch engagement from the first clutch, engaging the first power path, to the second clutch, engaging the second power path when there also is a need for performing a shift in the main gear box associated with the second power path. When performing this gear shift, the ECU may be programmed to control the power train such that the power connection in the second power path between the second input shaft connected to the second propulsion unit and the output shaft is interrupted while said shift of the main gear in the second power path is performed. However, the shift of the main gear in the second power path is performed before the change of the double clutch engagement from the first clutch to the second clutch is performed. In this case there is thus maintained a power connection between the first propulsion unit and the output shaft via the first power path having the first clutch of the double clutch arrangement engaged while the shift of the main gear associated with the second power path is performed.

Hence, the design of the powertrain enables the ECU to be programmed to control the powertrain in an efficient way to reduce or avoid power interruptions as described above. To be noted, the control strategies of the ECU as described above according to the first, second and third aspects of the invention may be used together all three of them, only two of them (any two) or being used separately. Hence, the ECU may be programmed as desired in order to perform these desired control strategies.

The powertrain may as previously mentioned be designed such that there is a common main gear box used for the first and second power path. Since the same main gear box is used for both power paths, the possible gear ratios in the main gear box for the different power paths are thus the same. In order to get different gear ratios from the different power paths the double clutch arrangement may be designed such that the power path which transfers torque via engagement of the first clutch of the double clutch arrangement provides a power connection representing a first gear ratio and when the second clutch is connected to the gear box is the second connection representing a second gear ratio different from the first gear ratio.

In order to provide an efficient shift of gears, the first and second clutches of the double clutch arrangement may engage with the main gear box at different positions representing the different power paths such that a change of the gear in the main gear box for the power path which not is engaged may be shifted while transmitting torque via the other power path. For example may the first clutch be connected to a main shaft or gear wheels of the main shaft in a main gear box while the second clutch may be connected to always engage with a countershaft of the main gear box.

The double clutch may thus provide two different gear ratios of the input power before the power reaches the main gear box.

In the above described configuration, an Internal combustion Engine (ICE) may be the first propulsion unit connected to the first input shaft and an Electric Motor (EM) may be used as the second propulsion unit. The EM is preferably designed such that it may be used as a generator for generating electricity when used for braking. Hence, the ICE may in this case be connected to the double clutch arrangement and the EM to the countershaft. To connect the EM to the countershaft is in general a more space saving way to connect the second propulsion unit to the gear box than using the main shaft. However, the EM could be connected to the main shaft instead.

Above has been exemplified that a single main gear box is used for both power paths. The single gear box could easily be replaced for two main gearboxes if desired. In this case is it not necessary to provide different gear ratios for the first and second clutch of the double clutch to the input shaft of the gear boxes in order to provide different gear ratios for the different power paths since the gears of the two main gear boxes may be designed such that they provide different gear ratios. Furthermore, each gear box may be provided with separate input shafts. Gear shifting in said Dual Clutch Transmission (DCT) can be initiated manually by the driver according to known art or being automatically controlled.

In an embodiment of the invention, the power train may be exemplified by a system comprising a DCT having a double clutch arrangement having a high (H) and low (L) gear ratio and a single main gear box having 3 forward gears (M1, M2, M3) and a reverse gear (R). The gear ratios of the main gears in the main gear box and the gear ratio of the first and second clutch may be designed such that from the first input shaft to the output shaft there are 6 different forward gears and 2 reverse gears provided, the gear ratios of the first and second clutch and the forward gears of the main gear box designed such that every second gear is associated with the same power path, i.e. a power path enabled by engagement of the same clutch, such that a one-step gear shift of the overall gear ratio from the first power path to the second power path involves a shift of the engaged clutch in the double clutch arrangement for all forward gears.

The invention further relates to a control method for a power train comprising a first and second propulsion unit for powering the vehicle and a Dual Clutch Transmission (DCT). The DCT comprises a first input shaft and an output shaft wherein the first input shaft is mechanically connected to a double clutch. The double clutch arrangement comprises a first clutch defining a first power path and a second clutch defining a second power path from the first input shaft to the output shaft. Each power path comprises a main gear box having at least two gears having different gear ratios. The main gear box may be the same for both power paths or two separate main gear boxes. The first propulsion unit is mechanically connected to the first input shaft such that a torque provided by the first propulsion unit is transferred to the output shaft via either of said first and second power path depending on which of the clutches of the DCT that is engaged. Each of the power paths has gear ratios defined by the gears in the power path including the gear ratio of the respective clutch and the gears of the associated main gear box such that an overall gear ratio from the first input shaft to the output shaft is defined. By gear ratio of the respective clutch is meant a gear ratio which is connected to the power path of the clutch which is not common for both power paths, i.e. a gear ratio which is solely connected with and only dependent on the selected clutch of the double clutch. At least some of said gear ratios of the first and second power path are designed such that a one-step upshift or downshift of the overall gear ratio from the first input shaft to the output shaft involves a shift of the power path, i.e. a shift of the engaged clutch in the double clutch arrangement. The second propulsion unit is connected to a second input shaft which does not involve the double clutch arrangement. The second input shaft is connected to the second power path downstream the double clutch but upstream the associated main gear box.

The above defined powertrain may be controlled according to a first control strategy such that when a gear shift of the overall gear ratio from the first input shaft to the output shaft is made involving a change of engagement of the double clutch arrangement from the second clutch, engaging the second power path, to the first clutch, engaging the first power path, the power connection between the second propulsion unit and the second power path is maintained.

According to a second control strategy, which may be used alone or together with the first mentioned control strategy, the powertrain may be controlled such that when a gear shift of the overall gear ratio is made by changing the double clutch engagement from the first clutch to the second clutch, the power connection between the second propulsion unit and the second power path is maintained provided that the desired gear of the main gear box associated with the second power path already is selected in order to shift to the desired overall gear ratio from the first input shaft to the output shaft.

According to a third control strategy, which may be used alone or together with both or either of the first and second mentioned control strategy, also relates to controlling the power train when a gear shift of the overall gear ratio is made by changing the double clutch engagement from the first clutch to the second clutch. In this case the power connection between the second propulsion unit and the second power path is interrupted if there is a need to change the main gear of the second power path in order to get the desired overall gear ratio from the first input shaft to the output shaft. The shift sequence is controlled such that the shift of the main gear in the second power path is performed before the change of the double clutch engagement from the first clutch to the second clutch is performed.

The control method may be performed on a powertrain in which the gear ratios of the main gears in the main gear box associated with the first and second power path are the same and the gear ratio for the first clutch of the double clutch is different from the gear ratio for the second clutch of the double clutch arrangement.

Further details and advantages of the invention will be obvious from the embodiments of the invention described in the following.

DETAILED DESCRIPTION

Figure 1:
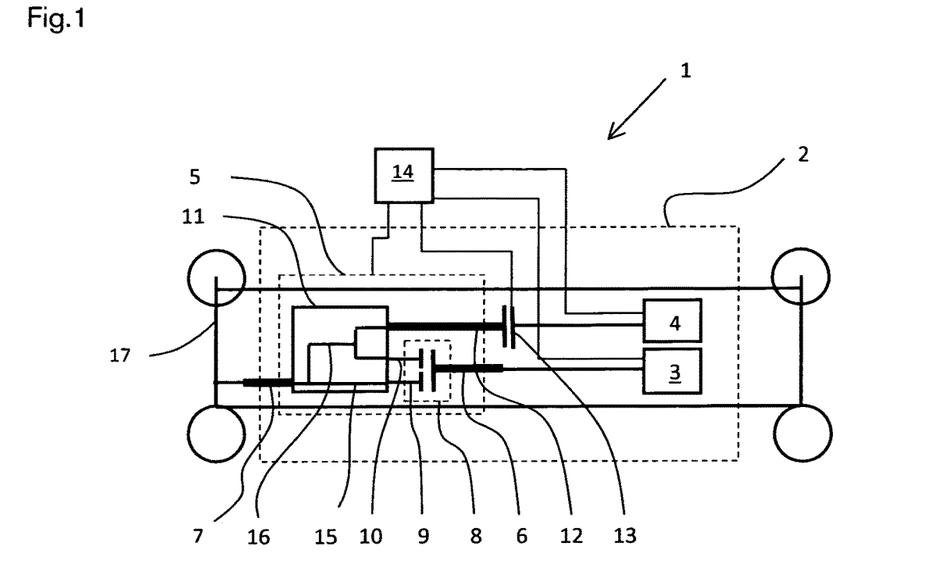
FIG. 1 describes a first embodiment of the invention disclosing a powertrain comprising a Dual Clutch Transmission (DCT) provided with a single main gear box.
Figure 3A:
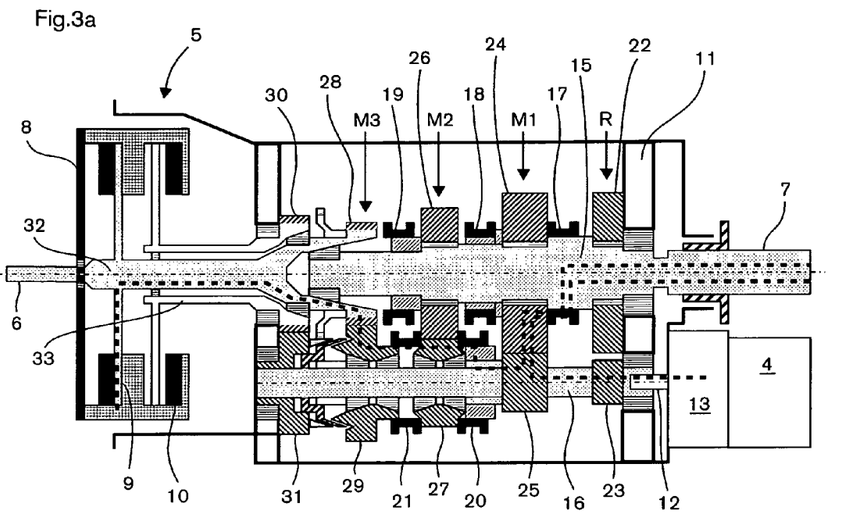
FIG. 3a-j describes a DCT suitable for the control method for a powertrain according to the first embodiment of the invention.

In FIG. 1 is schematically disclosed a hybrid vehicle 1 provided with a powertrain 2 according to a first embodiment of the invention. The power train 2 comprises a first propulsion unit 3, e.g. an Internal Combustion Engine (ICE), and a second propulsion unit 4, e.g. an Electrical Machine (EM), which are connected to a Dual Clutch Transmission (DCT) 5. The first propulsion unit 3 is mechanically connected to the DCT 5 via a first input shaft 6. The torque provided by the first propulsion unit 3 is thus transferred from the first input shaft 6 to an output shaft 7 via the DCT 5. The first input shaft 6 is connected to a double clutch arrangement 8. The double clutch arrangement 8 comprises a first clutch 9 and a second clutch 10 connected to a main gear box 11. A more detailed view of an example of a main gear box 11 and a double clutch arrangement 8 suitable for this power train 2 is shown in FIG. 3. The second propulsion unit 4 is connected to the DCT 5 via a second input shaft 12 bypassing the double clutch arrangement 8. The connection between the second propulsion unit 4 and the second input shaft 12 is optionally provided with a clutch 13 in order to be able to engage and disengage the second propulsion unit 4 from the main gear box 11. The power train 2 is further connected to an Electronic Control Unit 14 which is also connected to the first propulsion unit 3, the second propulsion unit 4, the DCT 5, including the double clutch arrangement 8 and main gear box 11, and the clutch 13 between the second propulsion unit 4 and the second input shaft 12. The double clutch arrangement 8 is designed such that the first clutch 9 is selectively connected to a main shaft 15 or gear wheels of the main gear box 11 representing a first power path through the DCT 5 and the second clutch 10 is connected to a countershaft 16 representing a second power path through the DCT 5. The first and second clutch 9, 10 are preferably connected to fixed gears with different gear ratios such that the gear ratio entering the main gear box 11 is different depending on which of the first and second clutch 9, 10 of the double clutch arrangement 8 that is engaged. The DCT 5 may be designed such that if the first clutch 9 is engaged, the gear ratio entering the main gear box 11 is low (L) while if the second clutch 10 is engaged, the gear ratio entering the main gearbox 11 is high (H). The second input shaft 12 connecting the second propulsion unit 4 to the main gear box is connected to the countershaft 16 representing the second power path through the DCT 5. This connection may also be associated with a fixed gear if desired to adjust the gear ratio entering the main gear box 11. Hence, the second input shaft 12 and the second clutch 10 of the double clutch arrangement 8 are thus transferring the torque from the propulsion units 3,4 to the output shaft 7 via the second power path and the first clutch 9 of the double clutch arrangement 8 is transferring the torque from the first propulsion unit 3 to the output shaft 7 via the first power path. The output shaft 7 is connected to a driven axle such that the vehicle 1 is powered.

The system described herein may be modified in several ways. For example, the specific kind of gear box is not crucial as long as there may be two different input connections from the dual clutch to the gearbox.

Likewise, the kind of engines/motors used may also be different than the exemplified ICE and EM. In addition, the optional single clutch 13 between the second propulsion unit 4 and the main gear box 11 is located outside the DCT 5 but could also be a part of the DCT.

Figure 2:
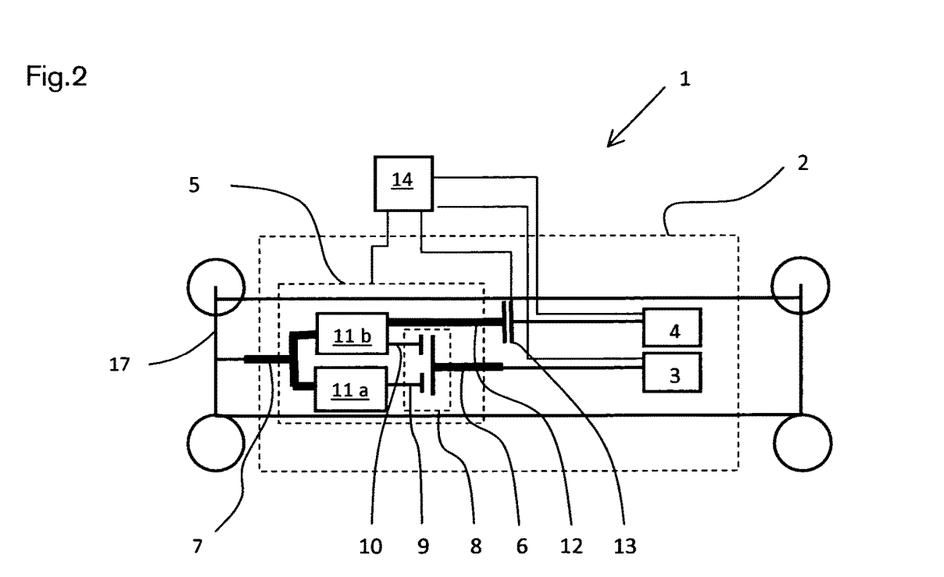
FIG. 2 describes a second embodiment of the invention disclosing a powertrain comprising a DCT provided with two main gear boxes.

In FIG. 2 an alternative embodiment of the invention is shown in which the single main gear box 11 in FIG. 1 has been replaced with a first main gear box 11a and a second main gear box 11b. In this embodiment the first main gear box 11a is connected to the first clutch 9 of the double clutch arrangement 8 and thus representing the first power path from the first propulsion unit 3 via the first input shaft 6 to the output shaft 7. The second clutch 10 of the double clutch arrangement 8 is connected to the second main gear box 11b and thus forms the second power path from the first propulsion unit 3 to the output shaft 7. The second propulsion unit 4 is also connected to the second main gear box 11b and may thus provide torque to the output shaft 7 via the second power path. In this embodiment it is not necessary that the first and second clutches 9, 10 have different output gear ratios in order to get different gear ratios when changing from engaging the first clutch 9 to engaging the second clutch 10 since the gear ratios of the gears in the main gear boxes 11a, 11b may be different, e.g. the lowest gear in the first main gear box 11a is lower than the lowest gear in the second main gear box 11b. As an example, if the main gear box 11 in FIG. 1 is provided with three forward gears M1, M2, M3 having different gear ratios and the first and second clutch 9, 10 also have different gear ratios, high (H) or low (L), there will be 6 possible combinations for the overall gear ratio which all may provide different gear ratios by designing the gear ratios of the main gear box and the double clutch properly. However, in the arrangement described in FIG. 2 is this arrangement not necessary even though it is possible to use. In this case is it also possible to use the same gear ratio, e.g. a direct (D) coupling with no gear ratio, for both clutches 9, 10 since the first main gear box 11a may be designed to provide the first, third and fifth gear (M1, M3, M5) and the second main gear box 11b to provide the second, fourth and sixth gear (M2, M4, M6). The main gear boxes 11, 11a, 11b could of course have fewer or more gears.

Hence, above is described two embodiments of the invention which enables certain positive benefits when changing a gear such that the power interruption during gear changes is decreased.

In FIG. 3a is described a main gear box 11 connected to a double clutch arrangement 8 which may be used in the embodiment described in FIG. 1. In FIG. 3a a DCT 5 is shown, comprising a double clutch arrangement 8 having a low (L) and a high (H) gear and a main gear box 11 having three forward gears (M1, M2, M3) and a reverse gear (R). In a working example of the DCT 5 the gear ratio of the double clutch arrangement 8 may be designed such that the ratio of the input rotational speed ($\omega$in) to the output rotational speed ($\omega$out) has a larger value for the low (L) gear connection used in the first power path than for the high (H) gear connection in the second power path. The gear ratios of the main gear box may be designed such that $\omega$in/$\omega$out is relatively large for M1, intermediate for M2 and relatively small for M3. The specific number for the gear ratios may differ and the gear ratios may be selected such that the change in the overall gear ratio is essentially the same when there is a one-step gear shift. The gears are also generally selected such that a one-step gear shift implies a change of clutch engagement in the double clutch arrangement 8, i.e. in the above exemplified arrangement is the first, third and fifth gear in the first power path and the second, fourth and sixth gear in the second power path. The gear box 11 comprises a main shaft 15 and a countershaft 16.

The selection of the desired gear is made by using different main gear clutches 17-21 for engagement or locking of gear wheels 22-31 so as to provide different power paths through the DCT 5. The power path from the first input shaft 6 to the output shaft 7 is also dependent on the output from the double clutch 8 which either may be via an inner intermediate shaft 32 connected to the first clutch 9 or via an outer intermediate shaft 33 connected to the second clutch 10.

A first main gear clutch 17 is slidably attached on the main shaft 15 in between a first main shaft gearwheel 22 used for the reverse gear R and a second main shaft gear wheel 24 used for the first gear M1. The first and second main shaft gear wheels 22,24 are rotatably arranged on the main shaft 15 such that the clutch 17 may be used to lock either the first main shaft gear wheel 22 or the second main shaft gear wheel 24 to the main shaft 15. The first main shaft gear wheel 22 intermeshes with a not shown reverse idler gearwheel that, in turn, intermeshes with first countershaft gear wheel 23 fixedly connected to the countershaft 16 and the second main shaft gear wheel 24 intermeshes with a second countershaft gear wheel 25 which also is fixedly connected to the countershaft 16.

A second main gear clutch 18 is slidably attached on the main gear shaft 15 in between the second main shaft gear wheel 24 and a third main shaft gear wheel 26 used for the second gear M2. Also the third main shaft gear wheel 26 is rotatably arranged on the main shaft 15 and the second main gear clutch 18 may be used to lock the third main shall gear wheel 26 to the main shaft 15. The third main shaft gear wheel 26 intermeshes with a third countershaft gear wheel 27 rotatably arranged on the countershaft 16.

A third main gear clutch 19 is slidably attached on the main gear shaft 15 in between the third main shaft gearwheel 26 and an intermediate inner shaft gear wheel 28 used for the third gear M3 such that the clutch 19 may be used to lock the intermediate inner shaft gear wheel 28 to the main shaft 15 thus forming a direct connection between the intermediate inner shaft 32 and the main shaft 15. To be noted, the intermediate inner shaft gear wheel 28 is fixedly attached to the intermediate inner shaft 32 which is mechanically connected to the first clutch 9 of the double clutch arrangement 8. The intermediate inner shaft gear wheel 28 intermeshes with a fourth countershaft gear wheel 29 which is rotatably arranged on the countershaft 16.

There is also an intermediate outer shaft gear wheel 30 which is fixedly attached to the intermediate outer shaft 33 which in turn is mechanically connected to the second clutch 10 of the double clutch arrangement 8. The intermediate outer shaft gear wheel 30 intermeshes with a fifth countershaft gear wheel 31 which is fixedly attached to the countershaft 16.

A fourth main gear clutch 20 is slidably attached on the countershaft 16 in between the second countershaft gearwheel 25 and the third countershaft gear wheel 27 such that the clutch 17 may be used to lock the third countershaft gear wheel 27 to the countershaft 16.

A fifth main gear clutch 21 is slidably attached to the fourth countershaft gear wheel 29 in between the third countershaft gear wheel 27 and the fourth countershaft gear wheel 29 such that the fifth main gear clutch 21 may be used to lock the fourth countershaft gear wheel 29 to the third countershaft gear wheel 27.

There is further disclosed a second input shaft 12 connected to a second propulsion unit 4, e.g. an Electric Machine (EM), via a single clutch 13. The second input shaft 12 thus does not use the double clutch arrangement 8 and is directly connected to the countershaft 16. Hence, the second propulsion unit 4 will only have three different gear ratios (EM1, EM2, EM3) from its input shaft 12 to the output shaft 7 which are selected by the engaged gear (M1, M2, M3) between the countershaft 16 and the main shaft 15 in the main gear box 11. A suitable gear ratio for the torque from the electric machine 4 to the countershaft 15 via the second input shaft 12 may be included on any side of the single clutch 13. To be noted, the single clutch 13 is not necessary, the countershaft 16 may be disconnected by the control of the main gear clutches 17-21 so as to allow a gear shift of the torque from the second input shaft 12 connected to the electric machine 4. Neither is there a need for a gear in order to change the gear ratio of the torque from the EM 4. Hence, the EM 4 may be connected directly to the countershaft 16 without any clutch or gear. However, it is in many cases desired to be able to disconnect the electric machine at certain occasions or driving conditions and a clutch 13 between the countershaft 16 and the EM 4 is therefore often desired for practical reasons.

In FIGS. 3a-j is the same gear box shown in different stages when performing an upshift sequence according to an embodiment of the invention when changing gear from the first gear to the sixth gear of the gear ratio from the first input shaft 6, connected to the first propulsion unit, to the output shaft 7. An ICE is used as the first propulsion unit 3 (see FIG. 1) and is connected to the double clutch 8. There are thus six possible different forward gears for the ICE (I1, 12, 13, 14, 15, 16) which may be selected by combining the two different gear ratios from the double clutch arrangement 8 (L or H) with the three different gears (M1, M2, M3) of the main gear box 11. Every second lower gear, i.e. first (I1), third (13) and fifth gear (15), are transferred via the inner intermediate shaft 32 connecting the first clutch 9 of the double clutch arrangement 8 and every second higher gear, i.e. second (12), fourth (14) and sixth (16), are transferred via the outer intermediate shaft 33 connected to the second clutch 10 of the double clutch arrangement 8. To illustrate the selected gear in FIGS. 3a to 3j, dashed lines have been used to indicate the power path through the DCT 5.

Hence, the gear ratios of the double clutch 8 and main gear box 11 are designed such that the lowest ICE gear (I1) corresponds to the engagement of the first clutch 9, which has a low (L) gear ratio, and the engagement of the first main gear (M1) and is denoted (LM1). This configuration is shown in FIG. 3a. In this configuration is the first main gear clutch 17 locking the second main gear wheel 24 to the main gear shaft 15. Furthermore, the fourth main gear clutch 20 is locking the third countershaft gear wheel 27 to the countershaft 16 and the fifth main gear clutch 21 is locking the fourth countershaft gear wheel 29 to the third countershaft gear wheel 27. Hence, the power entering the DCT 5 from the ICE (not shown) through the first input shaft 6 to the double clutch arrangement 8 is transferred by the engaged first clutch 9 via the inner intermediate shaft 32 to the intermediate inner shaft gear wheel 28. This gear wheel 28 intermeshes with the fourth countershaft gear wheel 29 which is locked to the countershaft 16 via the third countershaft gear wheel 27 such that the countershaft 16 rotates and may transfer the power to the main shaft via the second countershaft gear wheel 25, which is fixed to the countershaft 16, and intermeshes with the second main shaft gear wheel 24 which is locked to the main shaft 15 such that the power is transferred to the output shaft 7 via the main shaft 15. This power path is indicated by the dashed line from the first clutch 9 to the output shaft 7.

The second propulsion unit 4 (an Electric Machine (EM)) is connected to the countershaft 16 via a clutch arrangement 13 which is engaged such that the power from the EM 4 reaches the output shaft 7 from the countershaft 16 via the same path as the ICE, i.e. by the intermeshing second countershaft gear wheel 25 and second main shaft gear wheel 24 as indicated by the dashed lines from the second input shaft 12 to the output shaft 7. For the EM 4 the gear ratio to the output shaft 7 will be the product of the possible fixed ratio close to the single clutch 13 between the second input shaft 12 and EM 4 and the ratio provided by the gearwheels 24, 25.

Figure 3B:
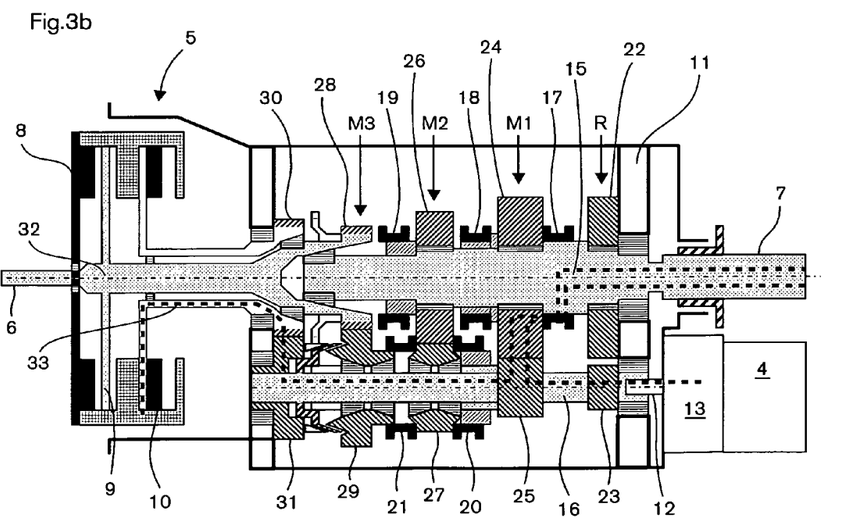

The second ICE gear (12) corresponds to engagement of the second clutch 10, which has a high (H) gear ratio, and the first main gear, i.e. M1, denoted HM1. This configuration is shown in FIG. 3b and the only difference in the DCT 5 made is to change the engagement from the first clutch 9 to the second clutch 10 of the DCT. The gear ratio for the EM 4 will remain the same as previously described in FIG. 3a.

Figure 3C:
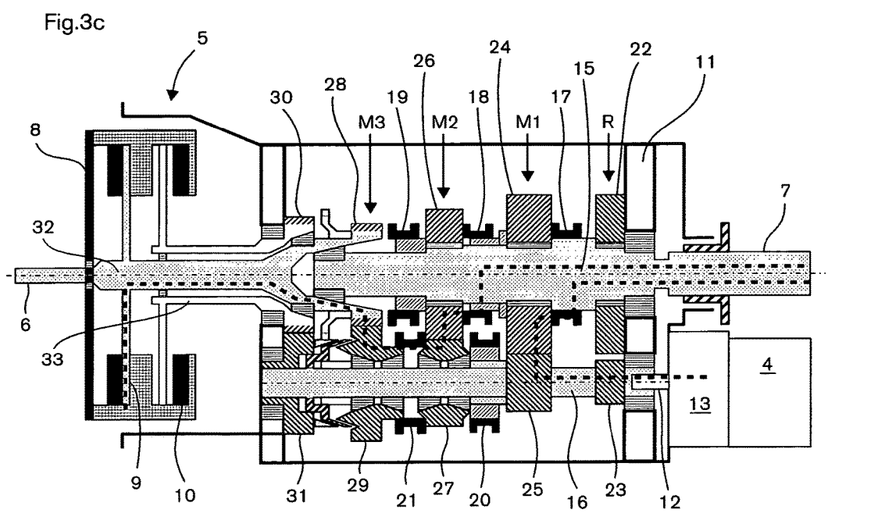

In FIG. 3c is shown a configuration of the DCT 5 corresponding to the third all over gear (13) from the first input shaft 6 to the output shaft 7. This shift is made such that the second main gear clutch 18 is changed from being disengaged to be engaged and thus locking the third main shaft gear wheel 26 to the main shaft 15. In addition, the fourth main gear clutch 20 which has been locking the third countershaft gear wheel 27 to the countershaft 16 has been released such that the third countershaft gear wheel 27 is rotatable on the countershaft 16. The main gears have thus been prepared for a shift from the second gear 12 to the third gear 13 while the power may have been continuously provided using the second gear 12. After this preparation the engaged clutch of the double clutch arrangement 8 may shift from the second clutch 10 to the first clutch 9 so as to engage the third gear 13. In this configuration the second power path for the second propulsion unit 4 to the output shaft 7 will remain the same. The power transmitted in the first power path from the first propulsion unit 3 will now be transferred from the first input shaft 6 via the intermediate inner shaft 32 connected to the engaged first clutch 9 to the intermediate inner shaft gear wheel 28. The intermediate inner shaft gear wheel 28 intermeshes with the fourth countershaft gear wheel 29 which is locked to the third countershaft gear wheel 27 which in turn intermeshes with the third main gear shaft gear wheel 26 which is locked to the main gear shaft 15 by the second main gear clutch 18 such that the power is transferred to the main shaft 15. Since the third and fourth countershaft gear wheels 27, 29 are disconnected from the countershaft 16, the power from the first propulsion unit 3 will not be transferred to the countershaft 16 at all but only to the main shaft 15. The power connection between the second propulsion unit 4 and the second countershaft 12 may thus be maintained, i.e. the clutch 13 still engaged. Hence, in short, the third ICE gear (13) corresponds to low (L) clutch position and second main gear (M2), i.e. (L 2) while the EM 4 still is connected to the output shaft via M1, i.e. the first gear for the electric machine (EM1). This configuration for the gear 13 is shown in FIG. 3c-e.

Hence, the above described configuration enables the second propulsion unit 4, the EM, to be connected when performing shifts between the first (I1), second (12) and third (13) gear from the first input shaft 6 to the output shaft 7. This will make it possible to perform a two-step gear shift from the first gear (I1) to the third gear (13), or vice versa, while still having a propulsion unit, i.e. the EM 4, connected such that it may provide motive power to the vehicle 1 when performing such a gear shift. Hence, by avoiding to disconnect the electric machine 4 when performing the shifts between the first three over all gears (II, 12, 13) will it be possible to provide motive force to the vehicle as well as using the electric machine 4 as a generator if braking is desired at any instance including at gear shifts. Hence, this configuration will make it possible to perform low speed driving with frequent stop and go, i.e. a city bus used in heavy traffic, without any need to disengage the EM 4 when only using the lower gears such that motive power may be supplied and regenerative braking used at every instant from the EM 4.

Figure 3D:
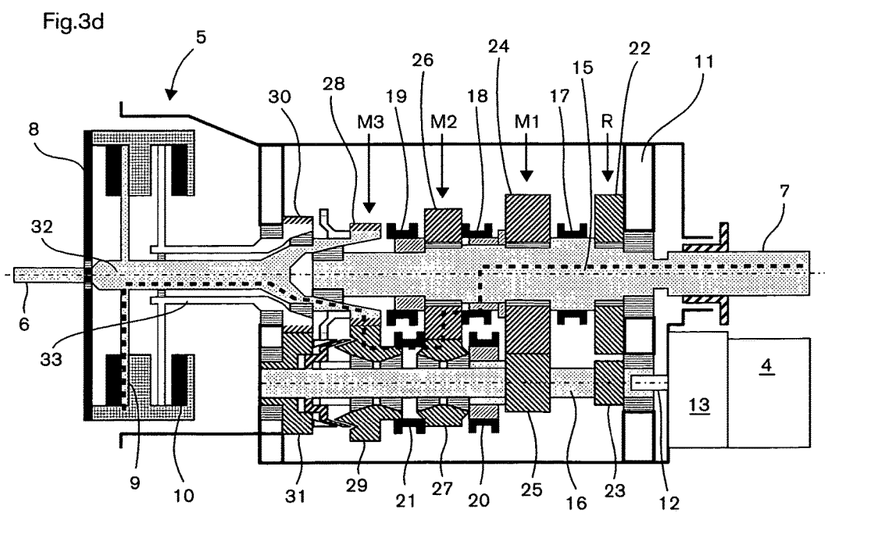

In case there is a desire to perform further upshifts from the third gear (13) from the first input shaft 6 to the output shaft 7 to the fourth all over gear (14), there will first be a power interruption of the EM 4 by disengaging the first main gear clutch 17 engaging the first main gear M1 in the second power path, as shown in FIG. 3c, such that the second power path is disengaged as shown in FIG. 3d. The disengagement of the first main gear M1 in the second power path is followed by the engagement of the fourth main gear clutch 20 locking the third countershaft gear wheel 27 to the countershaft 16 and thus engaging the second main gear M2 in the second power path as shown in FIG. 3e. Hence, the second gear EM2 of three possible gears from the second input shaft 12 to the output shaft 7 is now selected for the second propulsion unit 4. When performing this shift it is also possible to disengage the single clutch 13 between the second propulsion unit 4 and the second input shaft 12 if desired. However, this is not obligatory since the second propulsion unit 4 may be disengaged and engaged by only using the first and fourth main gear clutches 17, 20 when shifting from the first main gear M1 to the second main gear M2 in the second power path.

Figure 3E:
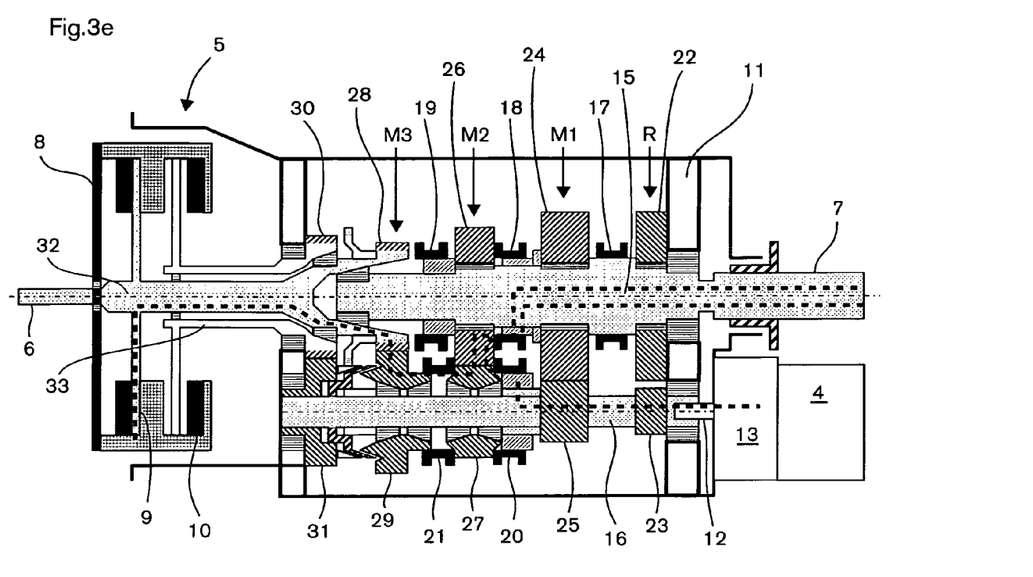
Figure 3F:
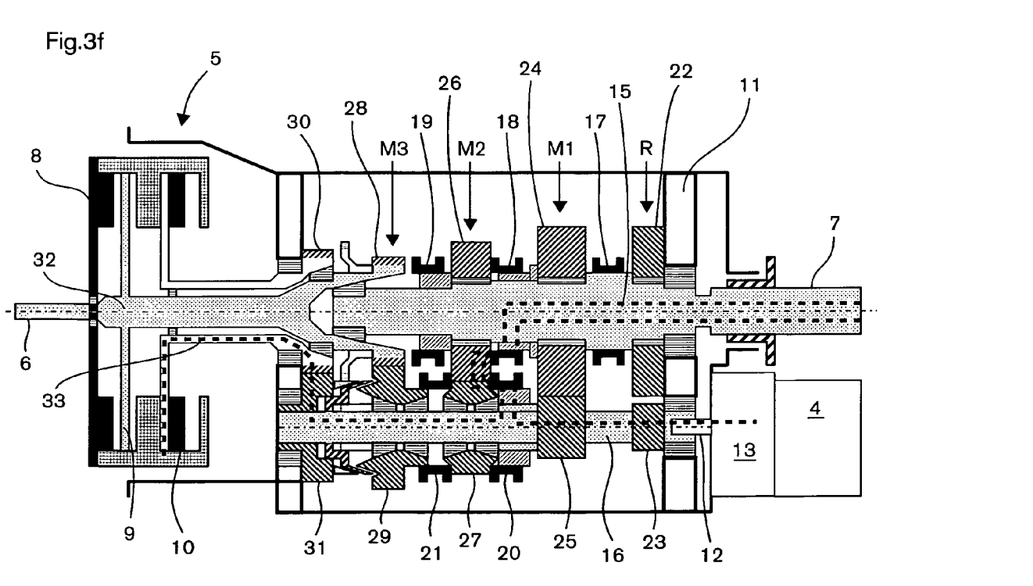

In order to change to the fourth overall gear 14, there will be a shift in the double clutch arrangement 8 from engaging the first clutch 9 as shown in FIG. 3e to engaging the second clutch 10 as shown in FIG. 3f. This configuration (the fourth ICE gear 14) thus corresponds to clutch/main gear position H and M2, denoted HM2. The gear ratio of the second gear from the second input shaft 12 to the output shaft 7 (EM2) is the gear ratio provided by the gearwheels 26, 27.

Figure 3G:
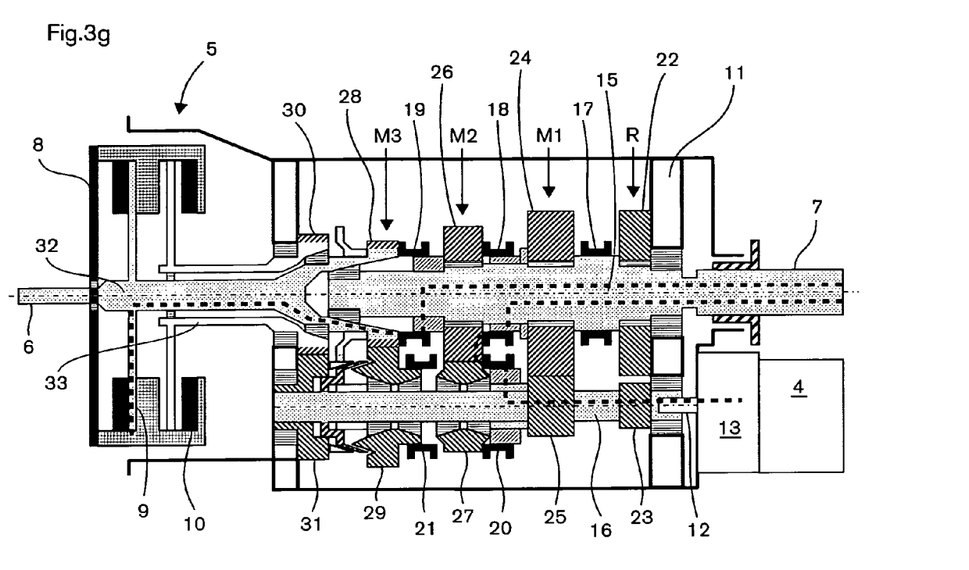
Figure 3H:
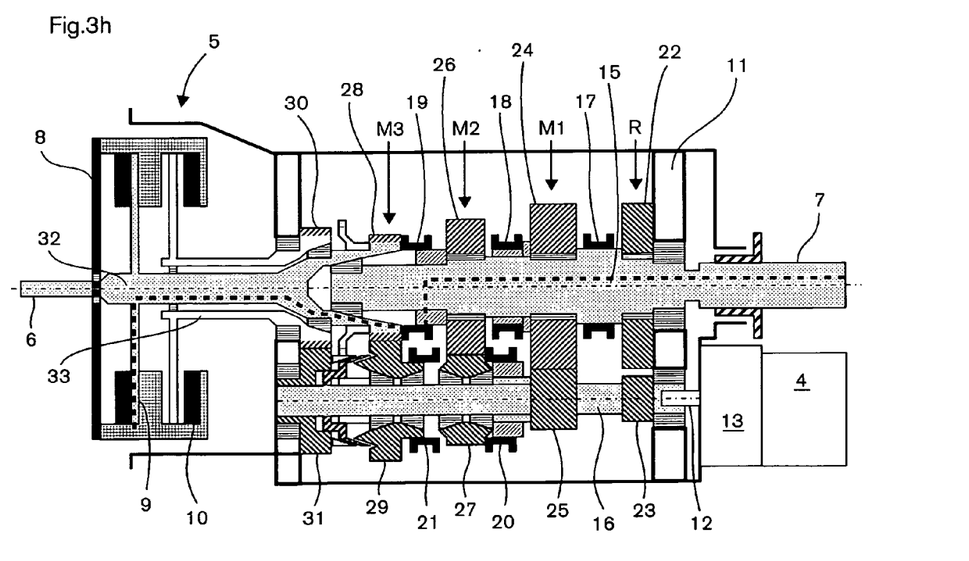
Figure 3I:
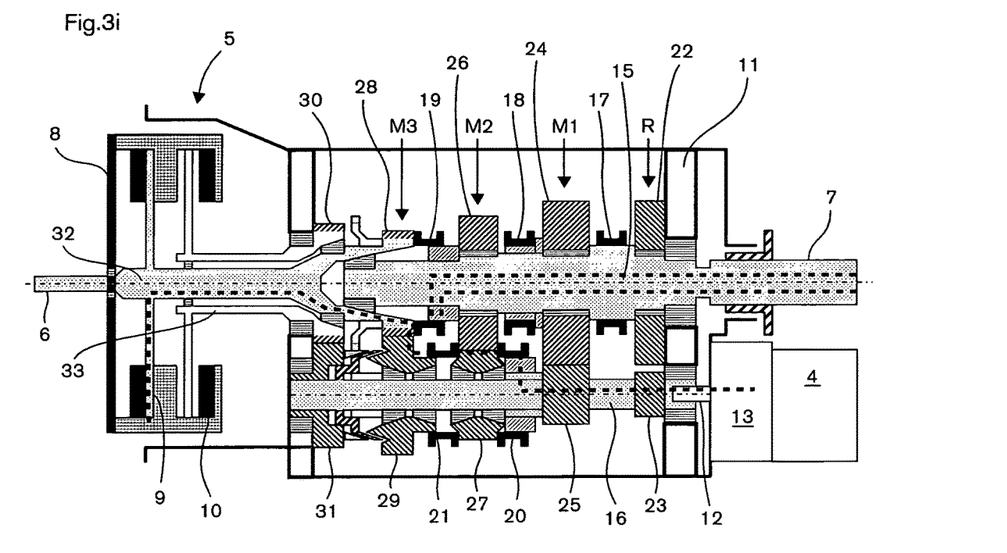

In FIG. 3g-i is shown the configuration for the fifth ICE gear 15 which corresponds to clutch/main gear selection L and M3. This change of gear from the fourth 14 to the fifth 15 gear is performed by changing the fifth main gear clutch 21 from being engaged to be disengaged, thus disengaging the second main gear M2 for the first power path, and engaging the third main gear clutch 19 thus engaging a direct coupling between the inner shaft 32 connected to the first clutch 9 of the double clutch arrangement 8 corresponding to the third main gear M3. At the same time, the second gear 2 is maintained as the main gear for the second power path. After the third and fifth main gear clutches 19, 21 have shifted their positions as described, a gear shift of the gear from the first input shaft 6 to the output shaft 7 may be performed by disengaging the second clutch 10 of the double clutch arrangement 8 and engaging the first clutch 9 such that the overall gear is shifted from the fourth gear 14 to the fifth gear 15 as shown in FIG. 3g. The gear from the second input shaft 12 to the output shaft is maintained at the second gear, E 2.

In order to perform still another upshift to the sixth ICE gear 16, the second main gear clutch 18 is disengaged from locking the third main shaft gear wheel 26 to the main shaft 15. Hence, the second main gear M2 for the second power path is disengaged and the second power path disengaged as shown in FIG. 3h and there is thus a power interruption of the second propulsion unit 4.

In the next sequence, which is shown in FIG. 3i, the fifth clutch 21 has been engaged such that the third and fourth countershaft gear wheels 27, 29 are locked to each other and the third countershaft gear wheel 27 is locked to the countershaft 16 by the fourth main gear clutch 20. Hence, the power from the second propulsion unit 4 is once again connected to the output shaft 7 via the second power path which now has the third gear M3 engaged. Hence, power may be transmitted from the second input shaft 12 to the output shaft 7 by the third gear of the second propulsion unit 4 with a gear ratio provided by the gearwheels 28, 29. In addition, the main gear for the second power path is thus prepared for a shift to the sixth overall gear 16.

Figure 3J:
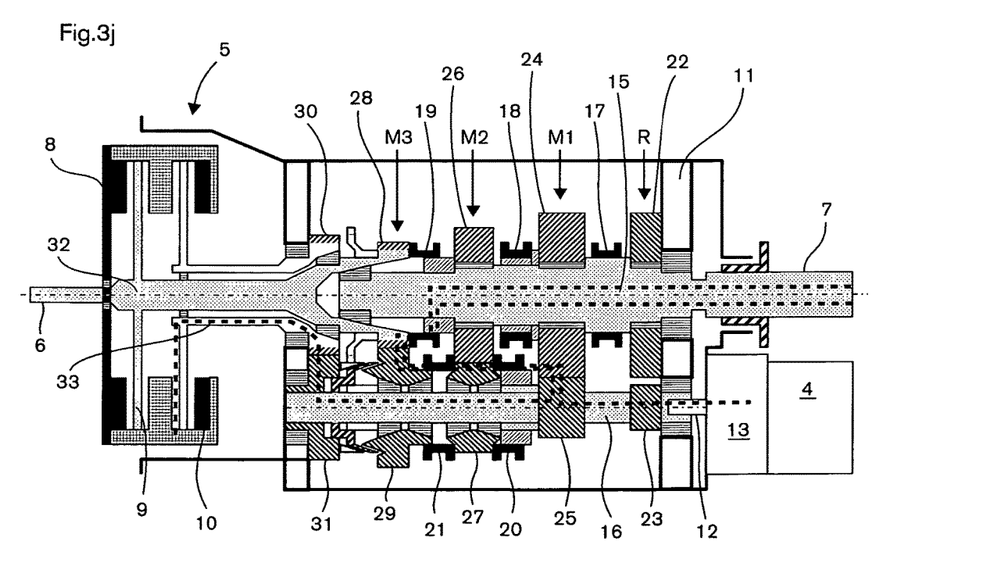

A shift to the sixth gear 16 is now easily made by disengaging the first clutch 9 of the double clutch arrangement 8 and engaging the second clutch 10. This configuration is shown in FIG. 3j. The configuration of the sixth overall gear 16 corresponds to clutch/main gear position H and M3, denoted HM3.

In order to make a down shift from the sixth gear 16 to II, the shift operations of the double clutch arrangement 8 and main gear box 11 are made in the reverse order.

Further to be noted, there is no need to disconnect the second propulsion unit when shifting between the first three gears 11-13. Likewise, there is no need to disconnect the second propulsion unit when there is a desire to use the gears 13-15 if the main gears are in the correct positions, i.e. the main gear for the second power path has the second gear M2 engaged. Since the second propulsion unit is connected it may be possible to use the second propulsion unit 4 for an additional power torque such that a down shift from the third gear 13 to the third gear 12 may be avoided or postponed thus avoiding power interruptions and allowing these gears to be used for broader speed range for the vehicle. Hence, if the third gear 13 may be used at lower speeds there may be a rather wide speed range for which vehicle may travel without the need for gear shifts causing power interruptions for the second propulsion unit 4. The present power train system thus provides for an efficient control of the propulsion of the vehicle including smooth driving and energy efficient driving with energy recovery when braking. In the above example, any desired values of gear ratios may be used. The gear ratios may of course be different depending on the vehicle and its intended use as well as the power and kind of propulsion units used. The gear ratios of the main gear and the clutches for a DCT with a single gear box are generally selected such that the consecutive gears are located in different power paths, i.e. a one-step gear change implies a change of the engaged clutch in the double clutch arrangement. These gear ratios may change, in particular if there are fewer or further main gears for the same kind of vehicle or for different kinds of vehicles.

For reverse gear (R) for the ICE, there are two different gear ratios depending on the selection of the first or second clutch having a low (L) or high (H) gear ratio and these gears are denoted LR for the low (first) reverse gear and HR for the high (second) reverse gear. The EM 4 will only have one reverse gear having a gear ratio corresponding to the gearwheels 22, 23.

The above described shifting strategy has the benefit of reducing the power interruptions for the EM, in particular if control strategies are used which strive to shift between 11-13 and 13-15, i.e. to allow a rather high speed of the vehicle when there is an upshift to the fourth gear and allow a rather low speed of the vehicle when there is a downshift to the second gear. The uninterrupted power connection between the EM 4 and the output shaft 7 may be used for either providing a torque to the wheels if necessary or using the EM 4 as a generator if braking action is needed.

The advantage is better understood if the arrangement is compared with alternative configurations of a hybrid drivetrain. For example, if an ICE is connected to the gear box via a single clutch and an EM is positioned between the clutch and the gear box, which is a known arrangement today, there will be a power interruption for the EM at each single gear shift. Hence, there will be a reduced possibility to provide a driving torque or regenerate braking energy with such an arrangement.

In case an ICE is connected to a gearbox provided with a double clutch arrangement, i.e. a Dual Clutch Transmission (DCT), and an EM is connected to the drivetrain between the ICE and DCT, may there be less power interruptions. However, when using the EM as a generator when performing a braking operation, a downshift may be desired and the braking operation must be reduced in order to allow the rather heavy EM to accelerate to have a speed which matches the higher speed desired at the lower gear. In addition, it is many times difficult to adapt the speed of the EM to provide a smooth ride. Hence, the braking energy may thus not be as efficiently used as desired and the comfort may be reduced.

Hence, the present arrangement with a DCT having an ICE connected to the double clutch arrangement and an EM connected, directly or via a single clutch, to either of the mechanical power lines of the double clutch, will provide for the possibility for an arrangement which efficiently may make use of braking energy and provide smooth driving properties.

Above has been described a drive train having 3 gears in the main gear box. The number of gears is not essential to the invention but could also be fewer, even though it is not likely, or more, e.g. 4 or 5 gears. It could also be possible to have further gears, e.g. a range gear having high and low gear positions, in addition to the double clutch arrangement and main gear box.

The invention claimed is:

1. A powertrain for a hybrid vehicle, the powertrain comprising:
    a first propulsion unit for powering the vehicle
    a second propulsion unit for powering the vehicle
    a Dual Clutch Transmission (DCT) comprising a first input shaft and an output shaft, the first input shaft being mechanically connected to a double clutch arrangement wherein a first power path is defined by engaging a first clutch of the double clutch arrangement and a second power path is defined by engaging a second clutch of the double clutch arrangement wherein power is transferred from the first input shaft to the output shaft, each power path comprising a main gear box wherein the main gear box comprises at least two gears having different gear ratios,
    the first propulsion unit being mechanically connected to the first input shaft such that a torque provided by the first propulsion unit is transferred to the output shaft via either of the first and second power path, and
    each of the power paths having gear ratios defined by gearwheels in the power path such that an overall gear ratio from the first input shaft to the output shaft is defined and at least some of the gear ratios of the first and second power path being designed such that a one-step upshift or downshift of the overall gear ratio from the first input shaft to the output shaft involves a shift of the power path, and the second propulsion unit being mechanically connected to a second input shaft of the DCT which connection does not include the double clutch arrangement and is connected to the second power path downstream the double clutch arrangement but upstream the associated main gear box the DCT is connected to an Electronic Control Unit (ECU) which is configured to control the engagement and disengagement of the first and second clutch of the double clutch arrangement and the gear positions of the gears of the main gear box associated with each one of the first and second power path,
    wherein the ECU is programmed to control the gear shift such that when a gear shift of the first propulsion unit is made in order to change the overall gear ratio from the first input shaft to the output shaft by changing the double clutch engagement from the second clutch, engaging the second power path, to the first clutch, engaging the first power path, the power connection between the second propulsion unit and the second power path is maintained,
    the second input shaft of the second propulsion unit is connected to a countershaft of the DCT, the countershaft being mechanically connected via gear wheels to a main shaft, the countershaft being a different shaft than output shafts from the first clutch respectively the second clutch of the double clutch arrangement, and
    the second propulsion unit is connected to the countershaft via a clutch.

2. A power train according to claim 1, wherein the ECU is programmed to control the gear shifts such that when a gear shift of the overall gear ratio from the first input shaft to the output shaft is made by changing the double clutch engagement from the first clutch, engaging the first power path, to the second clutch, engaging the second power path, the power connection between the second propulsion unit and the second power path is maintained provided that the desired gear of the main gear box associated with the second power path is already selected in order to shift to the desired overall gear ratio from the first input shaft to the output shaft.

3. A power train according to claim 1, wherein the ECU is programmed to control the power train such that when a gear shift of the overall gear ratio from the first input shaft to the output shaft is desired, and there is a need to change the double clutch engagement from the first clutch to the second clutch and to shift the gear of the main gear box of the second power path in order to get the desired overall gear ratio, the power connection between the second propulsion unit and the second power path is interrupted while the shift of the main gear in the second power path is performed, the shift of the main gear in the second power path is performed before the change of the double clutch engagement from the first clutch to the second clutch is performed.

4. A power train according to claim 1, wherein the first power path and the second power path comprises the same gear box.

5. A power train according to claim 4 wherein the first clutch, which forms part of the first power path, can be rotationally connected to a main shaft in the main gear box and the second clutch, which forms part of the second power path, is connected drivingly, with or without a gear ratio, to a countershaft (16) in the main gear box.

6. A power train according to claim 1, wherein there are separate main gear boxes for the first and second power path.

7. A powertrain according to claim 1, wherein the powertrain is designed such that there may be shifts performed between the three first overall gears from the first input shaft to the output shaft without the need for shifting the gear of the second propulsion unit being connected by the second input shaft to the output shaft via the main gear box.

8. A power train according to claim 1, wherein the first and second clutch of the double clutch arrangement are designed to provide different gear ratios.

9. A power train according to claim 8, wherein the gear ratios of the main gears in the main gear box for the first and second power path are the same.

10. A power train according to claim 1, wherein the first propulsion unit is an internal combustion engine and the second propulsion unit is an electric motor.

\* \* \* \* \*